United States Patent [19]
Leuthold et al.

[11] Patent Number: 5,697,708
[45] Date of Patent: Dec. 16, 1997

[54] HYDRODYNAMIC BEARING WITH REDUCED TEMPERATURE SENSITIVITY

[75] Inventors: Hans Leuthold; David Jennings, both of Santa Cruz; Lakshman Nagarathnam, Capitola; Raquib Khan, Pleasanton; Greg Rudd, Aptos, all of Calif.

[73] Assignee: Seagate Technology, Inc., Scotts Valley, Calif.

[21] Appl. No.: 563,589

[22] Filed: Nov. 28, 1995

[51] Int. Cl.6 .................................................. F16L 32/06
[52] U.S. Cl. ................................... 384/110; 384/120
[58] Field of Search .............................. 384/100, 110, 384/113, 114, 120

[56] References Cited

U.S. PATENT DOCUMENTS

| | | | |
|---|---|---|---|
| 3,391,965 | 7/1968 | Lindeboom | 384/110 |
| 4,710,034 | 12/1987 | Tittizer et al. | 384/110 |
| 5,246,294 | 9/1993 | Pan | 384/110 X |
| 5,524,985 | 6/1996 | Dunfield | 384/100 X |

*Primary Examiner*—Thomas B. Hannon
*Attorney, Agent, or Firm*—Flehr Hohbach Test Albritton & Herbert LLP

[57] ABSTRACT

A self-lubricating hydrodynamic spindle bearing comprising a stationary shaft including a conical, inwardly tapered surfaces extending axially form outer regions of the shaft toward a center connecting region of the shaft, a rotatably mounted sleeve surrounding the shaft and including surface regions flared axially inwardly toward a center region of the sleeve, the tapered surface regions and the flared surface regions defining a bearing gap for the hydrodynamic bearing, the sleeve defining a connection region adjacent the connecting region between the tapered surfaces of the shaft, the connection region including a tube collapsible in response to a change in internal pressure in the connection region to stabilize stiffness and power consumption in the bearing.

28 Claims, 3 Drawing Sheets

HYDRODYNAMIC BEARING WITH REDUCED TEMPERATURE SENSITIVITY

BACKGROUND OF THE INVENTION

This invention relates generally to hydrodynamic bearings, and more particularly to hydrodynamic bearings having a conical design and reduced temperature sensitivity.

As part of the continuing advances in computer technology, greater and greater amounts of data are sought to be stored in higher and higher densities on constantly rotating magnetic discs. Magnetic disc drives typically include one or more spinning magnetic discs supported on a common precision spindle bearing assembly for constant high speed rotation. At least one magnetic read/write head which flies in close proximity to each disc is provided at a selected location relative to each one of the discs. The head reads or writes streams of data from or to tracks which are in prescribed locations on the surface of the disc. The width of the tracks determines the number of tracks that can be defined on a given disc. The greater the number of given tracks, the greater the storage density. A magnetic disc drive assembly whose spindle bearing has low run out can accommodate higher track densities, and this results in increased storage density per disc.

A magnetic disc drive assembly whose spindle bearing has low run out can accommodate higher track densities, and this results in increased storage density per disc.

Hydrodynamic spindle bearings are known in which the shaft part and the housing part have respective, facing bearing surfaces which support relative rotary motion between the surfaces. By means of these bearing surfaces, one bearing part rides on film of liquid lubricant (e.g. oil) against the other part. Such bearings are well known in the technology and generally are characterized by low run-out, among other advantages. However, such bearings require a continuously circulating lubrication supply. It is this lubrication issue which is of great importance in the design of a successful hydrodynamic bearing, whether it be for use in a disc drive or in any other environment.

With the development of the self-contained lubrication type hydrodynamic spindle bearing, the main problem to be solved is preventing lubricant leakage out of the bearing. In any environment, the loss of such lubricant would degrade the performance of the bearing, shortening its life and reducing the stiffness or resistance to tilting of the bearing. The problems are especially acute in magnetic disc drives incorporating such hydrodynamic bearings, as these losses can degrade bearing performance and cause read/write errors. Further, leakage of lubricant can lead to contamination in the magnetic disc surface, causing malfunction of the read/write process or even catastrophic failure of the flying head assembly. Such disc drives are subjected to wide variations in operating conditions, especially in operating temperatures. Without careful design, such changes in temperatures or changes in pressures can result in substantial fluid losses from the bearings.

Despite other efforts to solve this problem such as the capillary trap and restrictive valve combinations shown in U.S. Pat. No. 5,246,294, the need for a hydrodynamic bearing having a reliable level of stiffness over a range of operating environments remains to be satisfied.

SUMMARY OF THE INVENTION

Therefore it is a general object of the invention to provide an improved hydrodynamic bearing which is relatively insensitive to temperatures.

It is a further objective of this invention to provide a hydrodynamic bearing which maintains its stiffness even across wide ranges of operating temperature environment.

Another objective of the invention is to provide hydrodynamic bearing which does not consume undue power even under stringent or difficult to operate conditions.

A further objective of the invention is to provide a hydrodynamic bearing which is highly stable and stabilized against tilting or wobble so that it is especially useful in disc drives or the like.

These and other objectives of the present invention are achieved in a hydrodynamic bearing of a conical design having a fixed shaft and a conical sleeve whose surface facing the shaft flairs inwardly toward a center region, the flared conical sections facing inwardly tapered regions of the shaft. The sleeve and shaft define at the axial center thereof a connection region which is concave in shape and preferably faces a flapped surface of the shaft to define a concave connection region. A collapsible tube is provided in the concave region which collapses under increased pressures as the operating environment changes. Collapse of the tube causes withdrawal of some of the lubricating fluid from between the facing surfaces of the conical bearing, reducing the wetted surface region between the bearings. As a result, even with changes in operating temperatures, the stiffness of the bearing remains stable while the consumption of power in the bearing does not vary excessively. As a result, a highly efficient bearing which is highly useful in disc drives and other similar operating environments is achieved.

BRIEF DESCRIPTION OF THE DRAWINGS

The above and other features and advantages of the present invention will be more fully understood by reference to the following detailed description in conjunction with the attached drawings in which like reference numerals refer to like elements and in which.

DETAILED DESCRIPTION OF A PREFERRED EMBODIMENT

Figure 1A:
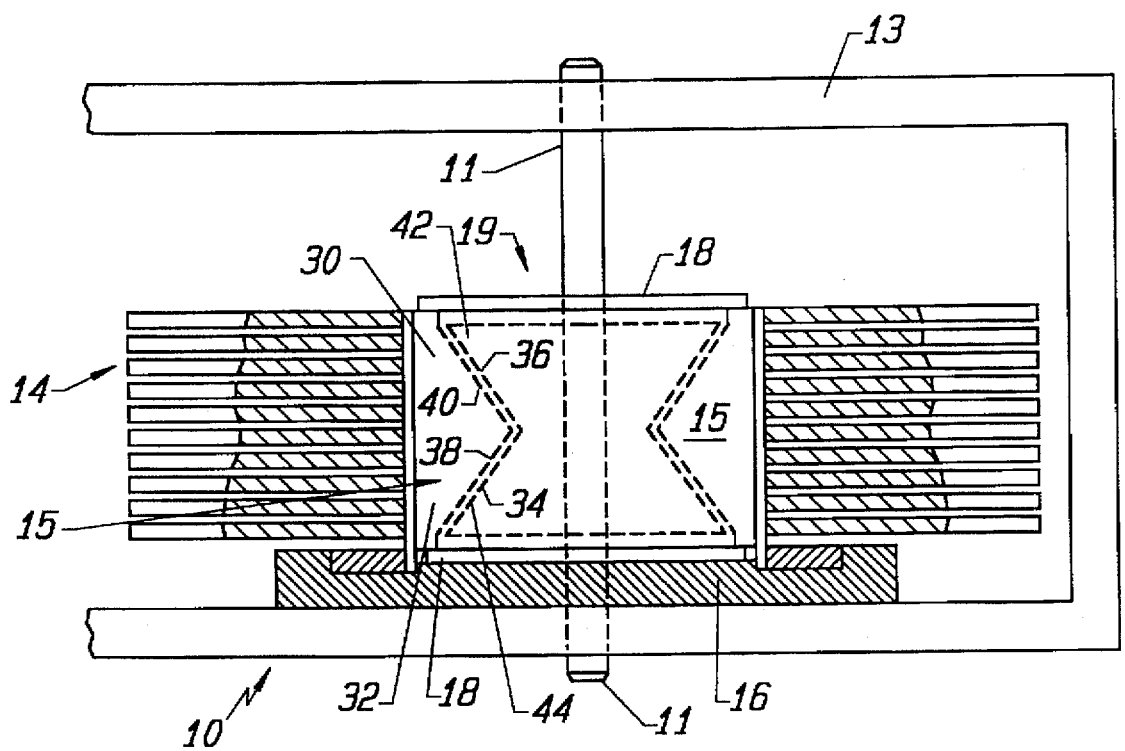
FIG. 1A is a top plan view of a disc drive with which the present invention is useful.
Figure 1B:
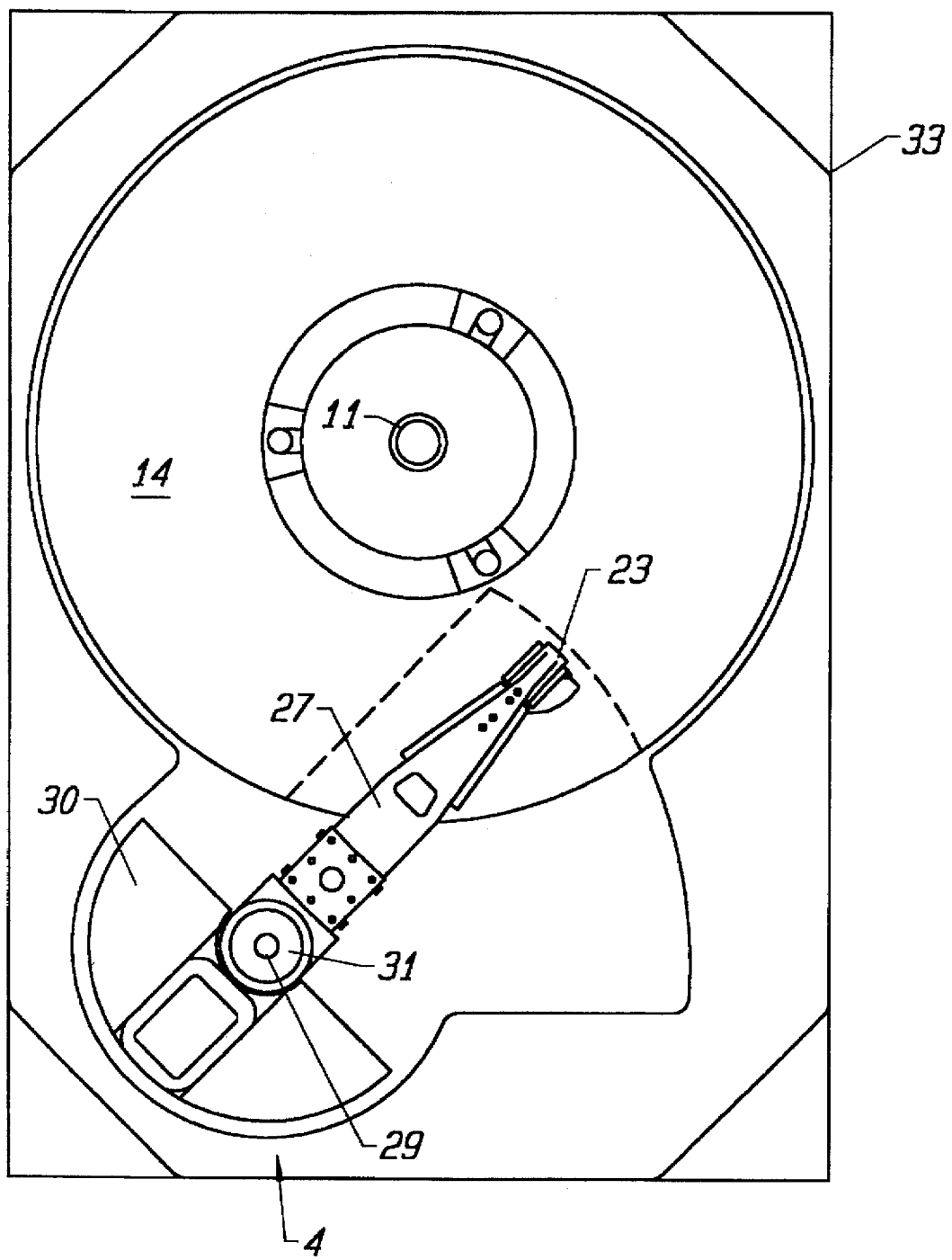
FIG. 1B is a cut-away side view of a magnetic disc drive assembly with which the present invention is useful.

An illustrative disc drive assembly 10 is shown in FIG. 1 where a shaft 11 is fixedly mounted in a housing 13 for the disc drive assembly. A hub 18 supports at least one and typically a plurality of magnetic discs 14 which are mounted concentrically to the spindle shaft and supported by a rotating spindle housing or sleeve 15. A motor 16, the details of which are not relevant to this invention, is also mounted to the frame 13 to drive the rotating housing 15 and cause the discs 14 to rotate. The means for accessing the data were shown schematically in FIG. 1B which also shows the shaft 11 mounting one of the discs 14. As seen in this figure, as the discs rotate, access to the data is obtained by servo placement of a transducer 23 supported on an actuator arm 27, and positioned by a voice coil motor 30 of a type well known in this technology. It is well known that the long life and usefulness of this design depends directly on the ability of the spindle motor to support the discs for constant speed, rotation and a uniform speed without tilt or wobble; the spindle motor must operate over widely varying environmental conditions because of the many heat sources which may be present nearby changing the environmental temperature over the period of operation, and must further have the ability to withstand significant shocks.

It is to achieve these benefits that a conical bearing of the type to be described below has been designed. Generally speaking, an embodiment of the bearing assembly 19 shown in FIG. 1A has housing or hub 15 surrounding shaft 11, and forming a pair of conical bearings 30, 32 with their apexes directed toward each other. Specifically, shaft 11 includes conical portions 34, 36 which mate with inclined wall portions 38, 40 but are separated therefrom by bearing gaps 42, 44 respectively. One side of the housing walls that define the bearing gaps, preferably the outer walls 38, 40 are grooved such as with inward pumping spiral grooves (not shown, but of a type well known in this technology) substantially over their bearing surfaces.

Figure 2:
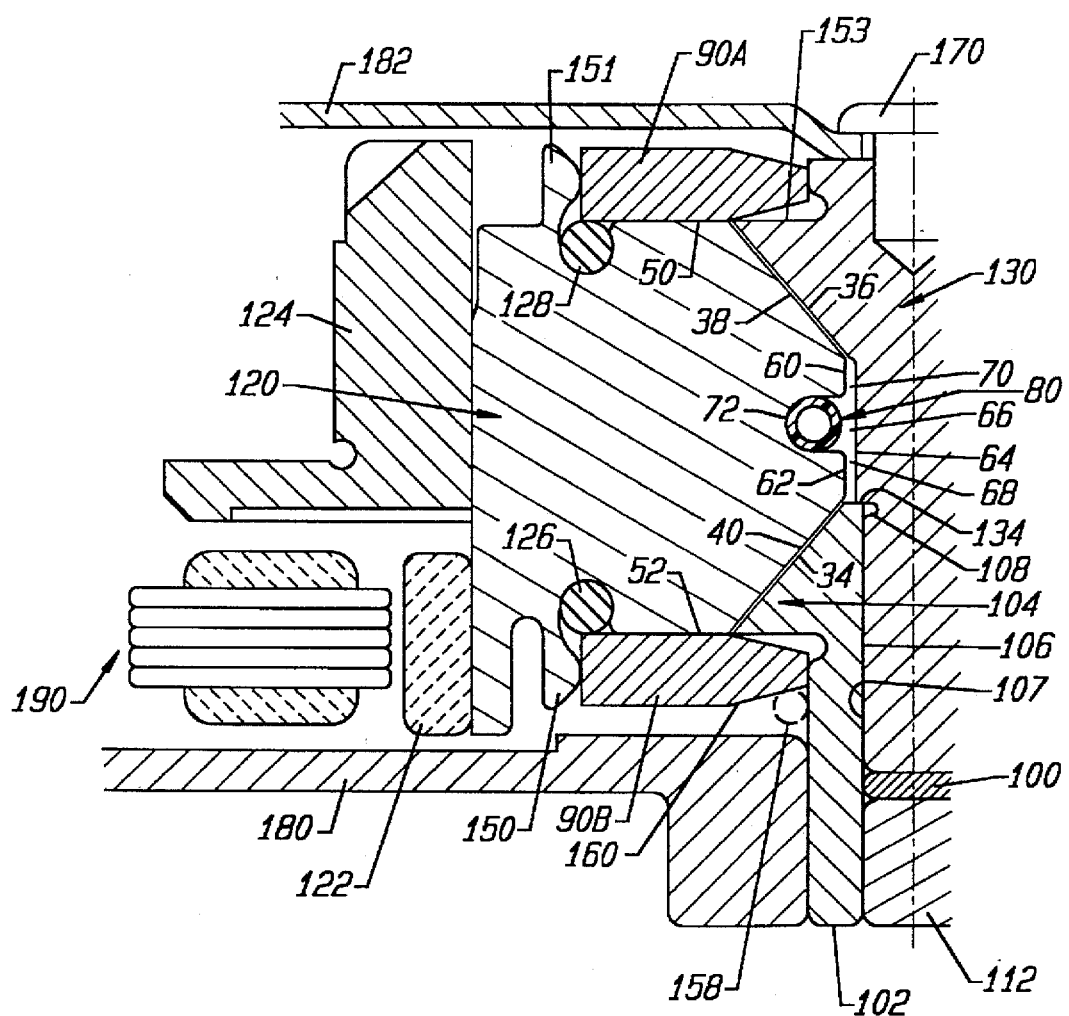
FIG. 2 is a partial side cross section of an embodiment of the present invention.

Referring further to FIG. 1A and to the more detailed drawing of a preferred embodiment of FIG. 2, it can be seen that the housing wall portions 38, 40 flare radially inwardly from transverse end walls 50, 52. As previously described, these surfaces face inwardly tapering wall sections 36, 34 to define the gaps 37, 39 of the bearing. The inwardly tapering surfaces 34, 36 are a part of the fixed shaft of this design. The wall portions 38 and 40, which flair outwardly toward the center of the bearing, end in short substantially vertical wall sections 60, 62 which cooperate with a vertical surface 64 of the shaft to define a connection or transition zone 70.

The short vertical wall sections 60, 62 at the ends of the flared cones of the sleeve define the openings 68 and 69 into the connection zone 70; the major region of the connection zone 70 is defined by concave recess 72 in sleeve 15. This sleeve 15 encircles and rotates around the stationary shaft 11 and the tapered cones which are a part thereof.

A hollow tube 80 is placed in the concave region and surrounds the stationary shaft 11. This tube 80 is made of a plastic material which is not permeable to oil or air. The tube is filled preferably with air at ambient pressure, although other gasses and pressures are possible. The tube 80 is collapsible when sufficient pressure is applied to the outside of the tube. That is, the tube is designed to flex and even collapse under sufficient pressure; this increases the available volume of the connection zone 70 surrounding the shaft, modifying the amount of lubricating fluid found between the bearing surfaces. The hydrodynamic bearing is primarily defined between the facing conical surfaces. The use of the conical surfaces to define the gap provides a wedged type design which provides substantial overall stability for the system along all axes against rocking or tilting. At least one of the two facing conical surfaces above and below the connecting regions have patterns of grooves to distribute the lubricating fluid through the bearing.

These grooves are in a spiral rather than a herringbone pattern (typically found in hydrodynamic bearings), and are designed so that all the pumping action is toward the center or connection zone 70. The result is to build up a considerable amount of pressure in this center connection region where the collapsible tube 80 is located. As this pressure builds up in the connector region, the tube which is filled with air at ambient pressure progressively collapses, drawing more of the fluid out from between the two relatively rotating conical surfaces into the connection region 70. The more region 70 draws fluid the less fluid is found at the bearing opening, until the fluid recedes such that the effective bearing surface begins to shrink. When the pressure does not increase anymore, an equilibrium is reached between the pressure in the system and the pump defined by the active, still wetted bearing area.

The bearing is now able to operate efficiently under a variety of environmental conditions. If the bearing is operating at a low temperature environment, the lubricating fluid has a high viscosity and the bearing is operating or pumping with a high efficiency level. As a result, the pressures will increase in the connection zone 64, causing the tube 80 to collapse, thereby depleting much of the bearing of its fluid and thereby diminishing the effective surface area of the bearing.

In contrast, in a high temperature, low viscosity environment, little or nothing of the bearing is depleted. This maintains the stiffness and diminishes the power consumption of the bearing. Overall, the power and stiffness vs. temperature balance of the overall system will be equalized so that the stiffness of the system necessary to support the disc mounted on the hub without tilt or wobble will be maintained while the power consumption will not be excessive. That is, as the operating temperature goes up, viscosity goes down, the bearing is less efficient and the power consumption is increased. So for a given level of fluid in the bearing, there is now less pressure with higher temperatures, and the tube 80 will collapse less than at lower temperatures. At higher temperatures, where the bearing is filled with fluid, more of the bearing surface is covered with oil, and there is more stiffness. This design thus balances out the fact that typically as the temperature increases, the stiffness decreases.

It is further well known that in a hydrodynamic bearing, as the operating temperature goes up, the viscosity goes down. Therefore, for a given level of fluid in the bearing, there is less pressure, and the tube 80 will collapse less than at a lower operating temperature so that more of the bearing remains filled with fluid. This will result in more of the bearing surface being covered with oil, and as a result more stiffness in the bearing.

Thus, this design improvement balances out the fact that stiffness goes up in a hydrodynamic bearing as temperature decreases, but so does power consumption, which is a bad thing for maintaining the operability of the bearing cartridge especially as used in a spindle motor which has limited power available. This present design provides the benefit of establishing a bearing wherein the power is not excessive even at the lowest probably operating temperatures and at that temperature there will still be the required stiffness. The design, by providing a balancing effect which plays off against operating pressure, will also provide a hydrodynamic bearing which is in the proper power consumption range even at lower temperatures, even while maintaining the necessary stiffness in the system at higher temperature. The primary benefit of this design is to have less power consumption at the lowest temperatures which is where excessive power consumption is most likely to occur, while maintaining sufficient stiffness even at the highest operating temperatures where the stiffness is the most likely to fall below the desired minimum level. Although the design disclosed herein will work across a wide range of angles for the taper of the conical bearing, it has been found that the largest apex angle would be about 60 degrees.

A further feature of the present invention which should also be noted is the presence of the sealing stopper 100 located near the bottom of the central, fixed shaft. It can be seen that the desired conical form of the fixed shaft includes a sleeve 102 incorporating on its outer surface a conical section 104 and having a flat axial inner surface 106. Substantial pressures are created during the operation of the bearing which could potentially cause oil to leak out from the connecting region 70 through the recess 108 which is provided to implement fitting the sleeve over the outer surface of the shaft, and between the shaft and sleeve and out into the outer atmosphere. It is to prevent this phenomenon from occurring that the stopper 100 is provided which is crushed between the end of the major portion of the shaft and a plug 112 which is inserted loosely into the bottom of the hydrodynamic bearing cartridge. The stopper or gasket 100 is pressed between these two pieces in piecing the density of the gasket and providing a tight seal against any lubricant leakage along the gap between the surfaces 106, 107.

The invention can be further understood by considering the sequence of assembly of the subject design. The assembly sequence begins with the sleeve 120, to which is attached the magnet 122 and the hub 124. The magnet is glued onto the outer part of the sleeve 120; the hub would typically be a shrink fit onto the outer surface of the sleeve. The o-rings 126, 128 are then placed in the channels on the upper and lower end surfaces of the sleeve. Next the collapsible hollow plastic tube 80 is placed in the concave recess 72 and the major portion 130 of the axle is passed through the top opening of the sleeve, extending through the connection region 70 and out the bottom of the sleeve. As this is done, the conical sleeve 104 which bears the lower cone which will mate with the lower conical bearing surface 40 is pressed into place over the surface of the sleeve. This is facilitated by typically holding the shaft portion 130 in a fixture, and pressing the sleeve 102 over the outer portion of the shaft until it butts up against the shoulder 134, the joinder of these two parts being facilitated by the recess 108 in the outer surface of shaft 130. At this point the bottom counter plate 90B is installed, this counterplate being pressed against the bottom surface 52 of the sleeve and capturing the o-ring 126 in its recess. The counterplate is held in place by the shoulder 150. A removable o-ring is also slipped into place adjacent the tapered end 160 of the counterplate 90B and the outer surface of the sleeve 104 which is now a part of the fixed shaft. This o-ring 158 shown in dotted lines in FIG. 2 is to seal a potential opening from one end of the hydrodynamic bearing against the outside atmosphere while the bearing is filled, the o-ring being removed after the filling process is complete.

The assembly which exists to this point is put into a vacuum oven, with a measured amount of oil placed on the top surface 50 where the top counterplate 90A will rest when final assembly is completed. Obviously, in this partially assembled cartridge for a motor, the top counterplate 90A is not in place until after the filling. Although alternative approaches to filling the bearing are sufficiently possible, this is believed to be the most efficient and the least likely to leave an oil residue outside of the tapered hydrodynamic bearing surfaces.

The partially assembled bearing cartridge is now placed in a heated vacuum chamber and all air is evacuated from the chamber resulting in all being withdrawn from between the bearing surfaces and the connection region 70. When normal pressure is restored, the oil which is resting on the surface 50 is drawn into the region of between the bearing surfaces 36, 38 and 34, 40 as well as the connection region 70 since no air is present. Now any remaining oil on the surface 50 is cleaned off, and the top counterplate 90A is squeezed into place inside the shoulder 151 to be held firmly in place with its taporing end over the outwardly extending surface 153 of the fixed shaft. The assembly is now complete with the exception of the gasket or crushed rubber ball 100 on the bottom together with the cap 112, and the rivet 170 on the top. At this point, the rubber ball 100 or gasket may be put in place and glued into place and the cartridge type assembly can now be either tested or stored for later use.

In order to incorporate this cartridge assembly into a disc drive, the assembly to this point has its lower region as defined by sleeve 102 inserted into an appropriate opening in the base 180, and the cap 112 is then pressed into place below the plug or gasket 100. It should be noted that the cap 112 should not fit too tightly as such might cause air to be trapped above the cap and forced back up into the hydrodynamic bearing. After a disc or discs are loaded on the hub 124, then the top cover 182 is placed over the spindle motor, and held in place by a rivet or screw 170 inserted into the top of the fixed shaft. The remaining pieces of the motor represented by the lamination and windings 190 in FIG. 2 are supported in the interior of the housing now established in accordance with the technology well known in this field.

By virtue of this design approach, a hydrodynamic bearing assembly of the conical type is defined wherein the power and stiffness are both controlled relative to the operating or environmental temperature. Where the temperature is lower in the operating environment than during the filling process, the added pressure build up between the cones compresses the cones and lowers the fluid level in the bearing, reducing the bearing surface from the outer diameter in the direction of the inner diameter of the conical bearing. When the pressure is greater, the opposite result occurs.

Other features and advantages of the present invention will become apparent to a person of skill in the art who studies the above disclosure.

What is claimed is:

1. A self-lubricating hydrodynamic spindle bearing comprising:
    a stationary shaft including conical, inwardly tapered surfaces extending axially from outer regions of said shaft toward a center connecting region of said shaft,
    a rotatably mounted sleeve surrounding said shaft and including surface regions flared axially inwardly toward a center region of said sleeve,
    said tapered surface regions and said flared surface regions defining a bearing gap for said hydrodynamic bearing,
    said sleeve defining a connection region adjacent said connecting region between said tapered surfaces of said shaft, said connection region including a tube collapsible in response to a change in internal pressure in said connection region to stabilize stiffness and power consumption in said bearing.

2. A bearing as claimed in claim 1 wherein said tube is filled with air at ambient pressure, ends of said bearing gap being in communication with the outside atmosphere so that changes in pressure cause said tube to collapse or fully inflate, altering the volume of lubricating fluid in said connection region thereby in said bearing gap.

3. A spindle bearing as claimed in claim 2 wherein said sleeve connection region includes a convex region supporting said tube adjacent said shaft.

4. A spindle bearing as claimed in claim 1 wherein inward pumping grooves for pumping hydrodynamic bearing fluid toward said connection region where said collapsible tube is located are defined on either said flared sleeve surfaces or said tapered shaft surfaces.

5. A spindle bearing as claimed in claim 4 wherein said inward pumping grooves are spiral grooves so that pumping action is toward said connection region holding said tube.

6. A bearing as claimed in claim 1 wherein said connecting region of said shaft includes a flat region extending parallel to an axis of said shaft and connecting said inwardly tapering regions of said shaft.

7. A bearing as claimed in claim 6 wherein each of said tapered surfaces tapers at a maximum angle of about 60 degrees from a center line of said shaft.

8. A hydrodynamic bearing as claimed in claim 6 wherein said connection region of said sleeve includes short axial faces cooperating with an axial face of said shaft to define transitional zones from said connection region to said bearing gaps between said flared and tapered surfaces.

9. A hydrodynamic bearing as claimed in claim 8 wherein said flared surfaces of said sleeve each terminate of an outer end thereon in a flat surface extending radially from said shaft, said shaft tapered surfaces ending in a substantially parallel flat surface extending partially toward a center axis of said shaft, said flat surfaces defining an end of said hydrodynamic bearing gaps and leading toward an opening to said atmosphere.

10. A hydrodynamic bearing as claimed in claim 9 including counterplates at either end of said sleeve resting on and extending over said flat end surface of said sleeve to enhance the stability of said sleeve.

11. A hydrodynamic bearing as claimed in claim 10 wherein each of said counterplates includes a tapered region extending radially from said end of said bearing gap toward said center axis of said shaft.

12. A hydrodynamic bearing as claimed in claim 11 including a channel in a flat top surface of said sleeve and radially spaced from said bearing gap, and an o-ring in said channel, said o-ring being compressed by said counterplate between said sleeve and said counterplate to prevent said lubricating fluid from seeping out of said gap of said bearing.

13. A hydrodynamic bearing as claimed in claim 12 wherein said sleeve includes a shoulder extending axially parallel to said shaft and supported on said sleeve immediately adjacent said channel and pressing against an end of said counterplate to hold said counterplate relative to said sleeve and said shaft.

14. A hydrodynamic bearing as claimed in claim 13 wherein at least one of said conical, inwardly tapering sections of said shaft includes an insert which incorporates said inward taper on an outer surface thereof and an axial surface on an inner surface thereof and is mated to an outer surface of said shaft, said shaft's axial surface being interrupted by a channel supporting means for preventing passage of lubricating fluid leaking between said insert and said shaft.

15. A spindle bearing as claimed in claim 14 wherein said shaft includes a first region wherein said outer surface of said shaft defines said inward taper and said axial surface of said shaft connecting region, said shaft further including a second region comprising said outer surface for mating with said sleeve.

16. A hydrodynamic bearing as claimed in claim 14 wherein said means for preventing passage of fluid comprises a gasket resting in said channel and pressed against an inner axial surface of said insert.

17. A hydrodynamic bearing as claimed in claim 16 wherein said channel is defined between an interior surface of said shaft and a plug captured between said shaft and said insert.

18. A spindle motor for use in a disc drive said spindle motor including a hub which supports one or more discs for rotation at a constant speed, and a hydrodynamic bearing supporting said hub on an outer surface of a rotatably mounted sleeve surrounding and rotating around a fixed shaft and including regions flared inwardly toward a center region of said sleeve, said flared surface cooperating with tapered surfaces of said fixed shalt to define a bearing gap for said hydrodynamic bearing, said shaft including a connecting region extending axially along said shaft to join said tapered regions, said sleeve defining a connection region between said flared surfaces and adjacent said connecting region, said connection region including a tube collapsible in response to a pressure change from normal operating pressure in said hydrodynamic bearing to stabilize stiffness and power consumption in said bearing.

19. A bearing as claimed in claim 18 wherein said tube is filled with air at ambient pressure, ends of said bearing gap being in communication with the outside atmosphere so that changes in pressure in said bearing gap cause said tube to collapse or inflate altering the volume of lubricating fluid in said connection region thereby in said bearing gap.

20. A bearing as claimed in claim 18 wherein each of said tapered surfaces tapers at a maximum angle of about 60 degrees as measured between said tapered surface and a center axis of said shaft.

21. A hydrodynamic bearing as claimed in claim 18 wherein said connection region of said sleeve includes short axial faces cooperating with an axial face of said shaft to define transition zones from said connection region to said bearing gaps between said flared and tapered surfaces.

22. A hydrodynamic bearing as claimed in claim 18 wherein said flared surfaces of said sleeve each terminate of an outer end thereon in a flat surface extending radially from said shaft, said shaft tapered surfaces ending in a substantially parallel flat surface extending partially toward a center axis of said shaft, said flat surfaces defining said hydrodynamic bearing gaps and leading toward an opening to said atmosphere.

23. A hydrodynamic bearing as claimed in claim 18 including counterplates at either end of said sleeve resting on and extending over a flat end surface of said sleeve to enhance the stability of said sleeve.

24. A hydrodynamic bearing as claimed in claim 23 wherein each of said counterplates includes a tapered region extending radially from said end of said bearing gap radially toward said shaft.

25. A hydrodynamic bearing as claimed in claim 24 including a channel in a flat top surface of said sleeve and radially spaced from said bearing gap, and an o-ring in said channel, said o-ring being compressed by said counterplate between said sleeve and said counterplate to prevent said lubricating fluid from seeping out of said gap of said bearing.

26. A hydrodynamic bearing as claimed in claim 25 wherein said sleeve includes a shoulder extending axially parallel to said shaft and supported on said sleeve immediately adjacent said channel and pressing against an end of said counterplate to hold said counterplate relative to said sleeve and said shaft.

27. A hydrodynamic bearing as claimed in claim 18 wherein at least one of said conical, inwardly tapering sections of said shaft includes an insert which incorporates said inward taper on an outer surface thereof and an axial surface on an inner surface thereof and is mated to an outer surface of said shaft, said shaft's axial surface being interrupted by a channel supporting means for preventing passage of lubricating fluid leaking between said insert and said shaft.

28. A disc drive incorporating the spindle motor of claim 27 and further including a top cover and a base to define a housing for said motor and said disc, the shaft of said spindle motor being fitted into said base at one end, an opposite end of said shaft being fixed to said top cover by a rivet passed through said cover and inserted into an end of said shaft.

* * * * *